(12) United States Patent
Chang et al.

(10) Patent No.: US 8,056,132 B1
(45) Date of Patent: Nov. 8, 2011

(54) CLIENT-SIDE TECHNIQUE FOR DETECTING SOFTWARE ROBOTS

(75) Inventors: Ming-Tai Chang, Taipei (TW); Jui-Pang Casper Wang, Taipei (TW); Lio Cheng, Taipei (TW); Kuan-Hua Chen, Taichung (TW)

(73) Assignee: Trend Micro Incorporated, Tokyo (JP)

( * ) Notice: Subject to any disclaimer, the term of this patent is extended or adjusted under 35 U.S.C. 154(b) by 635 days.

(21) Appl. No.: 12/260,347

(22) Filed: Oct. 29, 2008

(51) Int. Cl.
*G06F 11/00* (2006.01)
*G06F 12/14* (2006.01)
*H04L 9/32* (2006.01)

(52) U.S. Cl. ............... 726/23; 726/24; 726/25; 726/26; 726/27; 726/28; 713/187; 713/188; 713/189; 713/190; 713/194

(58) Field of Classification Search .............. 726/23
See application file for complete search history.

(56) References Cited

U.S. PATENT DOCUMENTS

| 7,093,294 B2 | 8/2006 | Ligafelt et al. |
| 7,716,340 B2 * | 5/2010 | Modrall .................... 709/227 |

OTHER PUBLICATIONS

Botnet—From Wikipedia, the free encyclopedia, 4 sheets [retrieved on Oct. 15, 2008]. Retrieved from the internet: http://www.en.wikipedia.org/wiki/Botnet.
IP address—From Wikipedia, the free encyclopedia, 6 sheets [retrieved on Oct. 15, 2008]. Retrieved from the internet: http://www.en.wikipedia.org/wiki/IP_address.
Phishing—From Wikipedia, the free encyclopedia, 9 sheets [retrieved on Oct. 16, 2008]. Retrieved from the internet: http://www.en.wikipedia.org/wiki/Phishing.
Guofei Gu, et al. "BotMiner: Clustering Analysis of Network Traffic for Protocol- and Structure-Independent Botnet Detection", 15 sheets [retrieved on Oct. 14, 2008]. Retrieved from the internet: http://www.usenix.org/events/sec08/tech/full_papers/gu/gu/_html/index.html.
Aleksander Kolcz, et al. "The Impact of Feature Selection on Signature-Driven Spam Detection", 8 sheets, 2004 CEAS, Dulles, VA., USA.
Evan Cooke, et al. "The Zombie Roundup: Understanding, Detecting, and Disrupting Botnets", 2005, pp. 39-44, Proceesings of SRUTI Workshop (Step to Reducing Unwanted Traffic on the Internet).
eWEEK 'Pump-and-Dump' Spam Surge Linked to Russian Bot Herders, Nov. 2006, 2 sheets [retrieved on Apr. 4, 2007]. Retrieved from the internet: http://www.eweek.com/print_article2/0,1217,a=194218,00.asp.
eWEEK Spam Trojan Installs Own Anti-Virus Scanner, Oct. 2006, 2 sheets [retrieved on Apr. 4, 2007]. Retrieved from the internet: http://www.eweek.com/print_article2/0,1217,a=191975,00.asp.

(Continued)

*Primary Examiner* — Longbit Chai
(74) *Attorney, Agent, or Firm* — Okamoto & Benedicto LLP

(57) ABSTRACT

Software robots ("bots") may be detected in a client computer using a client-side bot detector. The client-side bot detector may be configured to receive bot event profiles indicating IP (Internet Protocol) addresses involved in malicious online activities perpetrated by bots and time frames when the malicious online activities occurred. The client-side bot detector may determine dynamic IP addresses that have been dynamically assigned to the client computer by consulting a dynamic IP assignment profile of the client computer. The client-side bot detector may compare the bot event profiles against the dynamic IP assignment profile of the client computer to determine if the client computer is infected by a bot.

20 Claims, 7 Drawing Sheets

OTHER PUBLICATIONS

Longest common subsequence problem—From Wikipedia, the free encyclopedia, 5 sheets [retrieved on Apr. 5, 2007]. Retrieved from the internet: http://www.en.wikipedia.org/wiki/Longest_common_subsequence_problem.

Jeff Chan-Surbl—Quick Start, Feb. 2007, 5 sheets [retrieved on Apr. 5, 2007]. Retrieved from the internet: http://www.surbl.org/quickstart.html.

The Spamhaus Project, 2 sheets, webpage [online][retrieved on Apr. 5, 2007]. Retrieved from the internet: http://www.spamhaus.org/.

Champskud J. Skrepth, et al. "Robust Hash Functions for Visual Data: An Experimental Comparision", 2001, 1 sheet, Carinthia Tech Institute, School of Telematics & Network Engineering and Paris-London-University Salzburg, Department of Scientific Computing.

* cited by examiner

| Spam bots — Sending spam mails with the same or similar mail content. | | |
|---|---|---|
| IP (Where) | Timestamp (When) | Bot Activity (What) |
| 24.222.XXX.XXX | 2008/06/23 21:32:25 GMT | Sending spam mail with content like  —310 |
| 210.127.XXX.XXX | 2008/06/23 21:35:10 GMT | Sending spam mail with content like  —310 |
| 269.147.XXX.XXX | 2008/06/23 21:38:15 GMT | Sending spam mail with content like  —310 |

300

| Botsite – Host malicious/phishing sites with the same or similar pages | | |
|---|---|---|
| IP (Where) | Timestamp (When) | Bot Activity (What) |
| 193.219.XXX.XXX | 2008/06/24 10:30:25 GMT | Hosting a phishing-site, http://scXXX.com  —410 |
| 221.166.XXX.XXX | 2008/06/24 12:15:30 GMT | Hosting a phishing-site, http://scXXX.com  —410 |
| 211.108.XXX.XXX | 2008/06/25 06:10:15 GMT | Hosting a phishing-site, http://scXXX.com  —410 |

CLIENT-SIDE TECHNIQUE FOR DETECTING SOFTWARE ROBOTS

BACKGROUND OF THE INVENTION

1. Field of the Invention

The present invention relates generally to computer security, and more particularly but not exclusively to methods and apparatus for detecting software robots in client computers.

2. Description of the Background Art

Software robots, which are commonly referred to as "bots," are stealthy, unauthorized software programs running quietly in user computers. A bot can receive and execute instructions from a remote server computer operated by the bot's originator, which is also referred to as a "bot herder." A bot may also be pre-programmed to perform a function without additional instructions from a bot herder. A network of computers taken over by related bots is called a "botnet." A bot may be configured to use the infected computer, referred to as a "zombie," to perform malicious online activities including to send spam e-mails or to host a malicious website. For example, a bot may use the zombie computer to host a website to perpetrate phishing or other cyber crimes. Computers can be infected by bots via several different methods including virus infection, drive-by-web-downloads and spyware downloaders that install other software onto a computer. Most users don't even know their computers have been infected and become part of a botnet.

SUMMARY

Software robots ("bots") may be detected in a client computer using a client-side bot detector. The client-side bot detector may be configured to receive bot event profiles indicating IP (Internet Protocol) addresses involved in malicious online activities perpetrated by bots and time frames when the malicious online activities occurred. The client-side bot detector may determine dynamic IP addresses that have been dynamically assigned to the client computer by consulting a dynamic IP assignment profile of the client computer. The client-side bot detector may compare the bot event profiles against the dynamic IP assignment profile of the client computer to determine if the client computer is infected by a bot.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Being computer-related, it can be appreciated that some components disclosed herein may be implemented in hardware, software, or a combination of hardware and software (e.g., firmware). Software components may be in the form of computer-readable program code stored in a computer-readable storage medium, such as memory, mass storage device, or removable storage device. For example, a computer-readable storage medium may comprise computer-readable program code for performing the function of a particular component. Likewise, computer memory may be configured to include one or more components, which may be executed by a processor. Software components may be implemented in logic circuits, for example. Components may be implemented separately in multiple modules or together in a single module.

Figure 1:
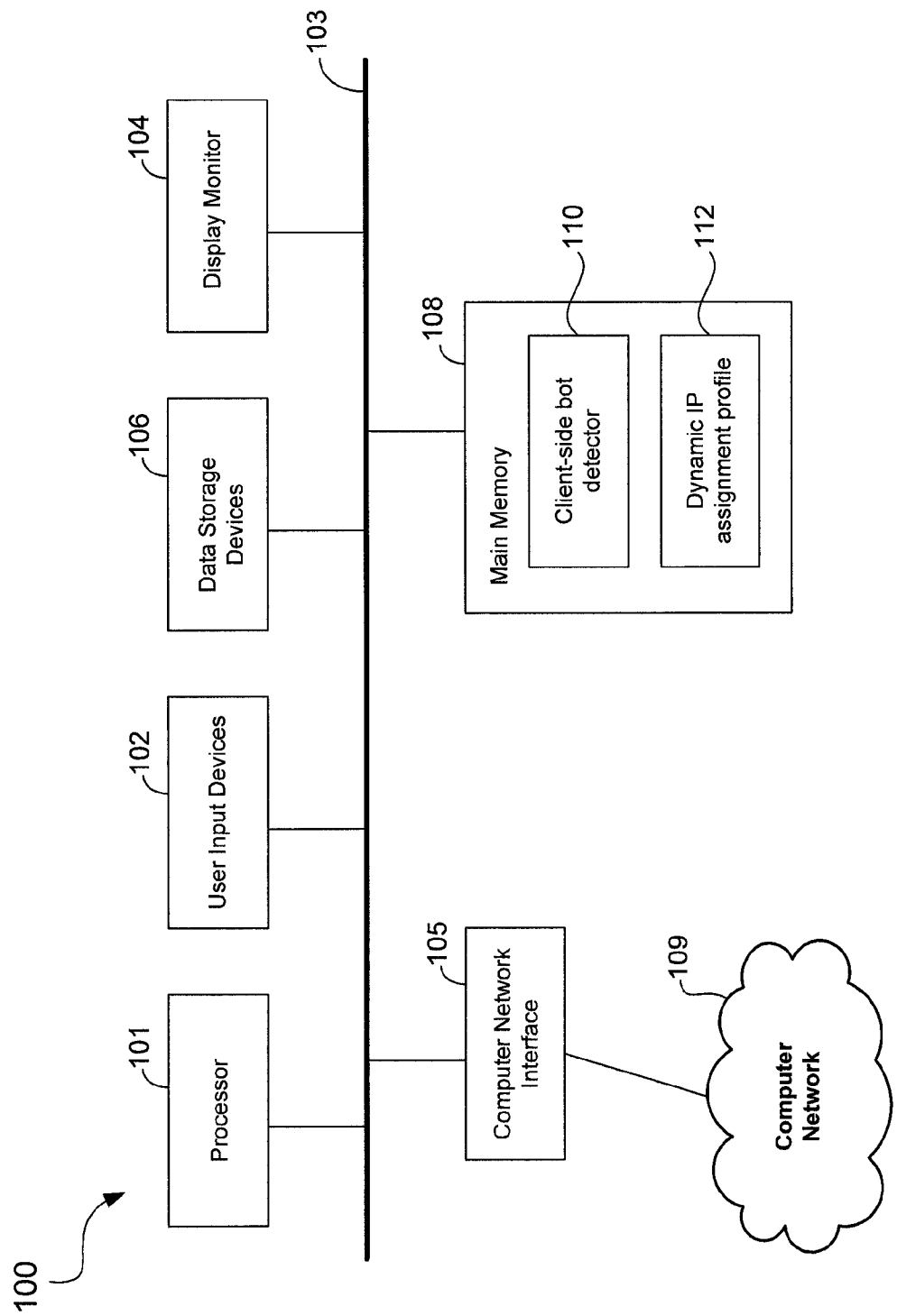
FIG. 1 shows a schematic diagram of a client computer in accordance with an embodiment of the present invention.

Referring now to FIG. 1, there is shown a schematic diagram of a client computer 100 in accordance with an embodiment of the present invention. The client computer 100 may have less or more components to meet the needs of a particular application. The client computer 100 may include a processor 101, such as those from the Intel Corporation or Advanced Micro Devices, for example. The client computer 100 may have one or more buses 103 coupling its various components. The client computer 100 may include one or more user input devices 102 (e.g., keyboard, mouse), one or more data storage devices 106 (e.g., hard drive, optical disk, USB memory), a display monitor 104 (e.g., LCD, flat panel monitor, CRT), a computer network interface 105 (e.g., network adapter, modem), and a main memory 108 (e.g., RAM). The computer network interface 105 may be coupled to a computer network 109, which in this example includes the Internet.

The main memory 108 includes software components of the client computer 100, which in the example of FIG. 1 includes a client-side bot detector 110 and a dynamic IP (Internet Protocol) assignment profile 112. The software components of the client computer 100 may be loaded from the data storage device 106 to the main memory 108 for reading and/or execution by the processor 101.

The client-side bot detector 110 may comprise computer-readable program code for detecting when the client computer 100 contains a bot, which may be using the client computer 100 to perform malicious online activities, such as to send spam e-mail or to host a malicious website. In one embodiment, the client-side detector 110 is configured to compare the dynamic IP assignment profile 112 against bot event profiles to determine if the client computer 100 has been compromised by a bot.

The client computer 100 may comprise a desktop or portable computer employed by home (as opposed to corporate or institutional) users to navigate on the Internet. Like typical client computers employed by home users, the client computer 100 uses a dynamically assigned IP address to communicate with other computers on the Internet. As is well known and in contrast to a static IP address that is manually assigned to a computer, a dynamic IP address is dynamically assigned automatically (typically in random) by the computer itself or a DHCP (dynamic host configuration protocol) server.

A dynamic IP assignment profile provides history tracking of the IP addresses assigned to a given client computer along with the time frames the client computer owns the assigned IP addresses. In the example of FIG. 1, the dynamic IP assignment profile 112 comprises computer-readable data indicating the dynamic IP addresses that have been dynamically assigned to the client computer 100. The dynamic IP assignment profile 112 may include time stamps indicating time frames when the client computer 100 is assigned a particular dynamic IP address to communicate over a computer network. As an example, the dynamic IP assignment profile 112 may have the following information:

210.127.XXX.XXX Time Frame: 2008/06/24 18:00:00 GMT to 2008/6/26 06:00:00 GMT
    212.106.136.XXX Time Frame: 2008/06/11 08:10:00 GMT to 2008/06/26 23:30:00 GMT
    114.45.48.XXX Time Frame: 2008/06/25 19:32:10 GMT to 2008/06/26 01:01:00 GMT In the above example, the client computer 100 currently uses the IP address "210.127.XXX.XXX" and has been assigned that IP address from 2008/06/24 18:00:00 GMT to 6/26 6:00:00 GMT. The X's in the above and following examples represent a decimal digit in accordance with IP address naming convention, and not specifically spelled out in the interest of clarity.

The dynamic assignment IP assignment profile 112 may be generated by the client-side bot detector 110 or other client-side monitoring program by keeping track of IP addresses of the client computer 100 and logging the monitoring results in the dynamic IP assignment profile 112. The client-side detector 110 may update the dynamic IP assignment profile 112 whenever the client computer 100 is assigned a new dynamic IP address. The dynamic profile 112 may be stored in data storage 106 and loaded into the main memory 108. As another example, the dynamic IP assignment profile 112 may also be generated from DHCP server logs maintained by the Internet Service Provider (ISP) providing Internet service to the client computer 100. In that example, the ISP would provide the dynamic IP assignment profile 112 to the client computer 100 on a regular basis as part of an anti-bot campaign.

Figure 2:
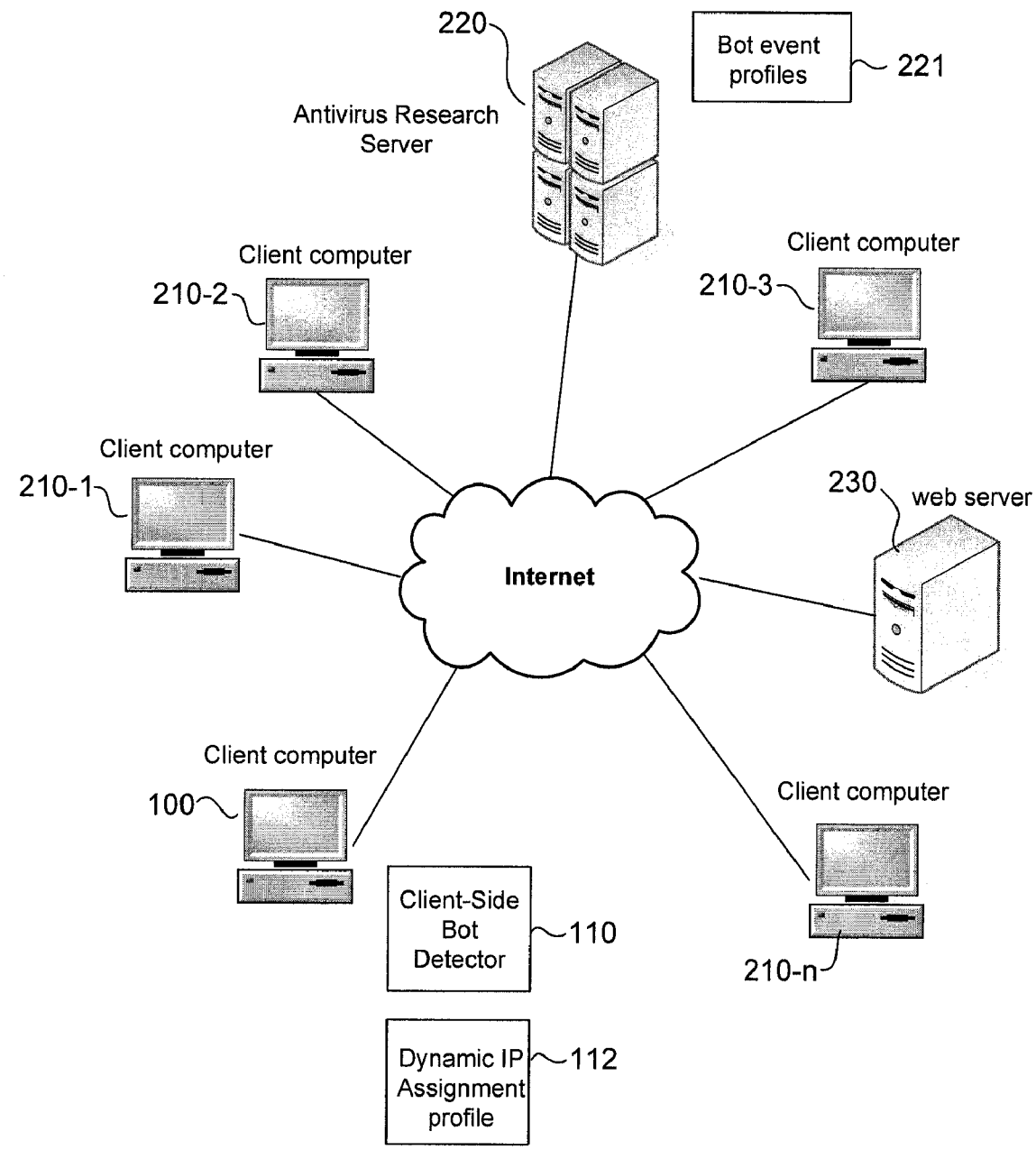
FIG. 2 schematically shows a computing environment where client-side bot detection in accordance with an embodiment of the present invention may be performed.

FIG. 2 schematically shows a computing environment where client-side bot detection in accordance with an embodiment of the present invention may be performed. In the example of FIG. 2, the client computer 100 and the client computers 210 (i.e., 210-1, 210-2, 210-3, . . . ,210-n) are coupled to the Internet to access web servers, such as a web server 230. There are a variety of web servers 230 on the Internet but only one is shown in FIG. 2 for clarity of illustration. A web server 230 may comprise a server computer hosting a website that provides information by way of web pages and/or online services, such as banking, e-commerce, and so on. As previously explained, the client computer 100 may include the client-side bot detector 110 and the dynamic IP assignment profile 112.

An antivirus research server 220 may comprise a server computer maintained by an antivirus research center to gather and maintain bot event profiles 221. The antivirus research facility may comprise the TrendLabs™ antivirus research center of Trend Micro, Inc., for example. The bot event profiles 221 may comprise a listing of bot events, such as malicious online activities performed by bots including sending of spam e-mails or hosting of malicious websites. The bot event profiles 221 may indicate when a bot event occurred, the type of malicious online activity performed by the bot (e.g., sending of spam e-mails or hosting a malicious website), and the IP address involved in the malicious online activity. As can be appreciated, the IP address involved in the bot event is the IP address of the zombie computer hijacked by the bot.

The bot event profiles 221 may be generated by monitoring for bot events on the Internet. A bot event may be characterized by same or similar malicious online activities performed by different computers. In other words, if there is a group of computers performing the same malicious online activity, then those computers are most likely zombies controlled by bots. Moreover, because zombies are typically compromised personal home computers, they would have dynamic hosts that can be verified by checking ISP (Internet Service Provider) DNS (Domain Name System) records.

As an example, a bot event performed by spam bots (i.e., a bot that sends spam e-mails) may be identified by looking for same or similar spam e-mails sent by different computers. As another example, a bot event where zombie computers are hosting malicious websites may be identified by looking for same or similar web pages on malicious websites hosted by different computers. The antivirus research center may maintain honey pot computers and other data collection computers on the Internet to identify same or similar spam e-mails sent by different computers. The antivirus research center may also have antivirus researchers look for malicious websites or obtain a listing of malicious websites from a variety of sources to find same or similar web pages hosted on different computers.

Figure 3:
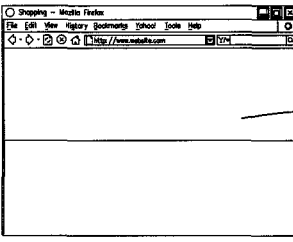
FIG. 3 illustrates in table form an example bot event that may be indicated in bot event profiles in accordance with an embodiment of the present invention.
Figure 3:
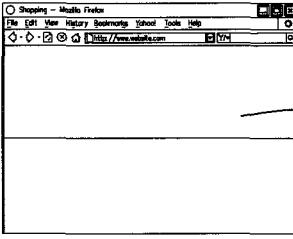
Figure 3:
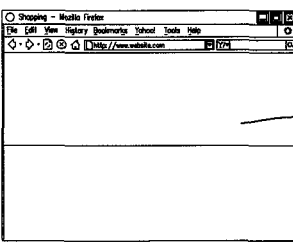

FIG. 3 illustrates in table form an example bot event 300 that may be indicated in the bot event profiles 221 in accordance with an embodiment of the present invention. In the example of FIG. 3, the bot event profiles 221 indicate the IP address of the computer that sent the spam e-mail ("where" column), when the spam e-mail was detected ("when" column), and the type of bot activity ("what" column). In the example of FIG. 3, the bot activity is sending of spam e-mails 310 with particular content. The spam e-mails 310 in the bot event of FIG. 3 have the same content but sent by different computers, indicating that the spam e-mails were sent by a botnet of spam bots. The spam e-mails and information about them may be collected by data collection computers and forwarded to the antivirus research center for inclusion in the bot event profiles 221.

A bot event where bots turn computers into botsites to host malicious websites may be identified by looking for malicious websites with same or similar web pages on the Internet. Malicious websites may be found manually by antivirus researchers. Generally speaking, malicious websites may be identified by analyzing their web page HTML contents to determine if the web page is set up for phishing attacks to steal user information, contains malicious client-side scripts, contains hyperlinks(IFRAME attack) to malicious codes, or is a malicious code downloader. Malicious websites and information about them may be forwarded to the antivirus research center. Those that have the same or similar web page or web pages and hosted by different computers as indicated by their IP addresses may be deemed as a bot event and included in the bot event profiles 221.

Figure 4:
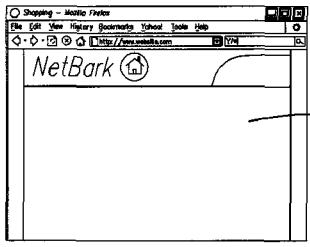
FIG. 4 illustrates in table form another example bot event that may be indicated in bot event profiles in accordance with an embodiment of the present invention.
Figure 4:
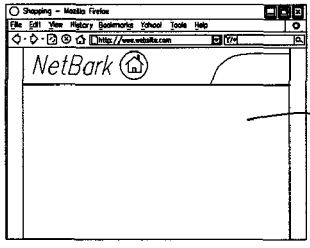
Figure 4:
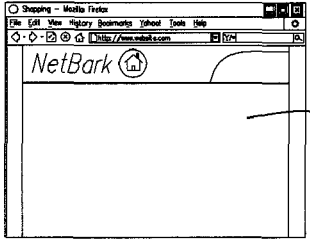

FIG. 4 illustrates in table form an example bot event 400 that may be indicated in the bot event profiles 221 in accordance with an embodiment of the present invention. In the example of FIG. 4, the bot event profiles 221 indicate the IP address of the computer hosting the botsite ("where" column), when the botsite was detected ("when" column), and the type of bot activity ("what" column). In the example of FIG. 4, the bot activity is a botsite for phishing. The botsites in the bot event of FIG. 4 have the same web pages 410 but hosted in different computers, indicating the malicious websites are botsites hosted on zombie computers controlled by bots.

Figure 5:
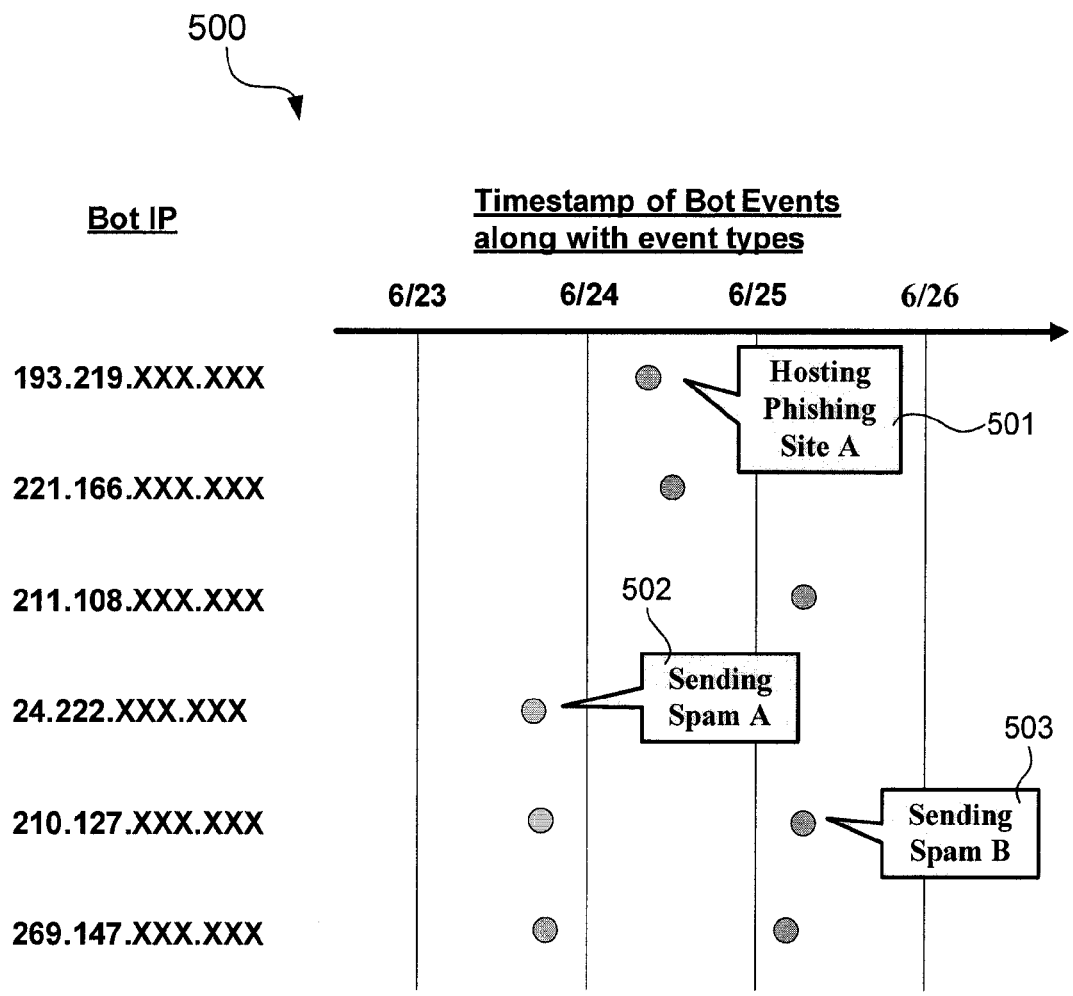
FIG. 5 shows example time stamps of bot events that may be included in bot event profiles in accordance with an embodiment of the present invention.
Figure 6:
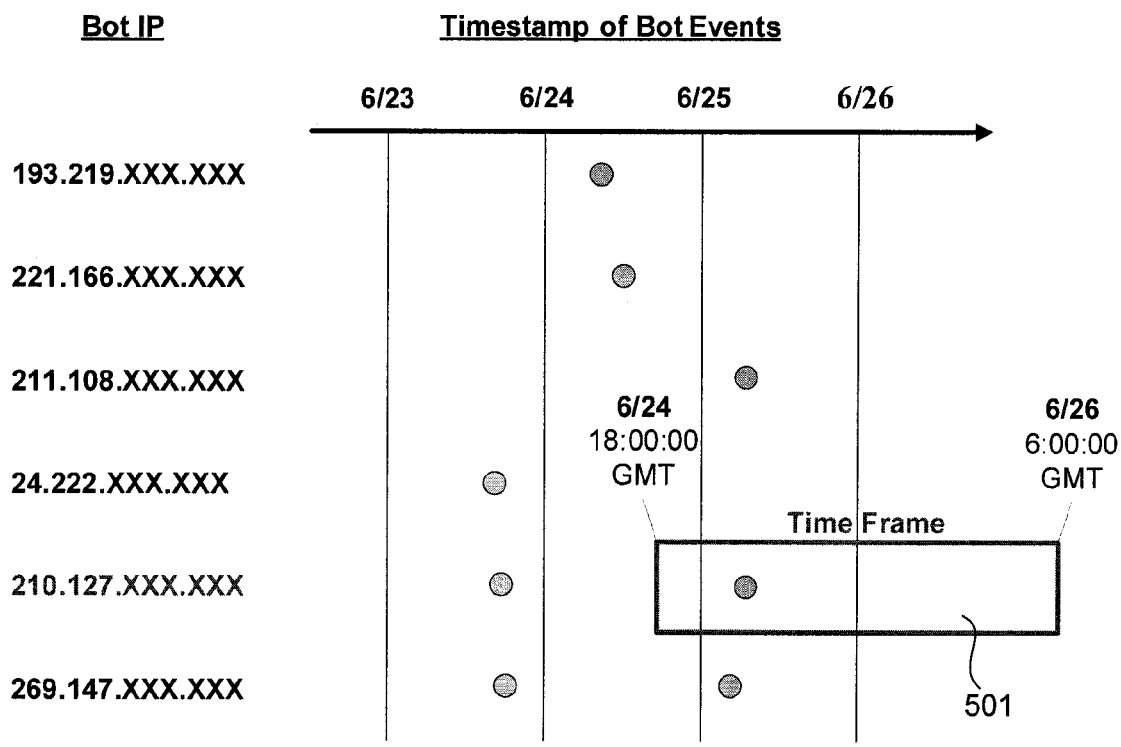
FIG. 6 shows mapping of a time frame during which a dynamic IP address is assigned to a client computer against the time stamps of FIG. 5 in accordance with an embodiment of the present invention.

FIG. 5 shows example time stamps 500 of bot events that may be included in the bot event profiles 112 in accordance with an embodiment of the present invention. In the example of FIG. 5, the IP addresses (see "Bot IP") of zombie computers involved in the bot events 300 and 400 are enumerated including time stamps indicating the date (and also time, which is not specifically shown in FIG. 5; see FIG. 6) the bot event was detected and the type of bot activity. For example, the time stamps of FIG. 5 indicate that a computer having the IP address "193.219.XXX.XXX" was detected as hosting a botsite (see 501) on 6/24, a computer having the IP address "24.222.XXX.XXX" was detected as sending spam e-mail (see 502) on 6/23, and a computer having the IP address "210.127.XXX.XXX" was detected as sending spam e-mail (see 503) on 6/25.

In one embodiment, the client-side bot detector 110 receives the bot event profiles 112 in the client computer 100. For example, the client computer 100 may periodically receive updated bot events profile 112 from the antivirus research server 220. The client-side detector 110 may compare the contents of the dynamic IP assignment profile 112 against the contents of the bot event profiles 112 to determine whether the client computer 100 has been compromised, i.e., infected by a bot. The client-side detector 110 may check the bot event profiles 221 for bot events involving any of the dynamic IP addresses that have been assigned to the client computer 100 as indicated in the dynamic IP assignment profile 112. If a dynamic IP address assigned to the client computer 100 is involved in a bot event, the client-side detector 110 determines if that dynamic IP address was assigned to the client computer 100 at a time frame when the bot event occurred. The client-side bot detector 210 deems the client computer 100 to be compromised if it was assigned a dynamic IP address involved in a bot event during the time frame the bot event occurred.

As a particular example, assuming the dynamic IP assignment profile 112 indicates that the client computer 100 was assigned the IP address "210.127.XXX.XXX" in a time frame between 6/24 18:00:00 GMT and 6/25 6:00:00 GMT and the bot event profiles 221 include the time stamps 500, the client-side bot detector 110 would deem the client computer 100 as being infected by a bot. This is graphically illustrated in FIG. 6 where the time frame 601 indicates when the client computer 100 has been assigned the IP address "210.127.XXX.XXX." Because the time stamps 500 indicate the IP address "210.127.XXX.XXX" as being involved in a bot event during the time frame 601, the client-side bot detector 110 would deem the client computer 100 as compromised.

A zombie computer is typically a home computer with dynamically assigned IP address that changes over time. This makes zombie computers relatively difficult to track and particularly identify. By comparing the dynamic IP assignment 112 with the bot event profiles 221, the client-side detector 110 advantageously allows for determining whether a particular client computer (the client computer 100 in this example) has been taken over by a bot and turned into a zombie.

Figure 7:
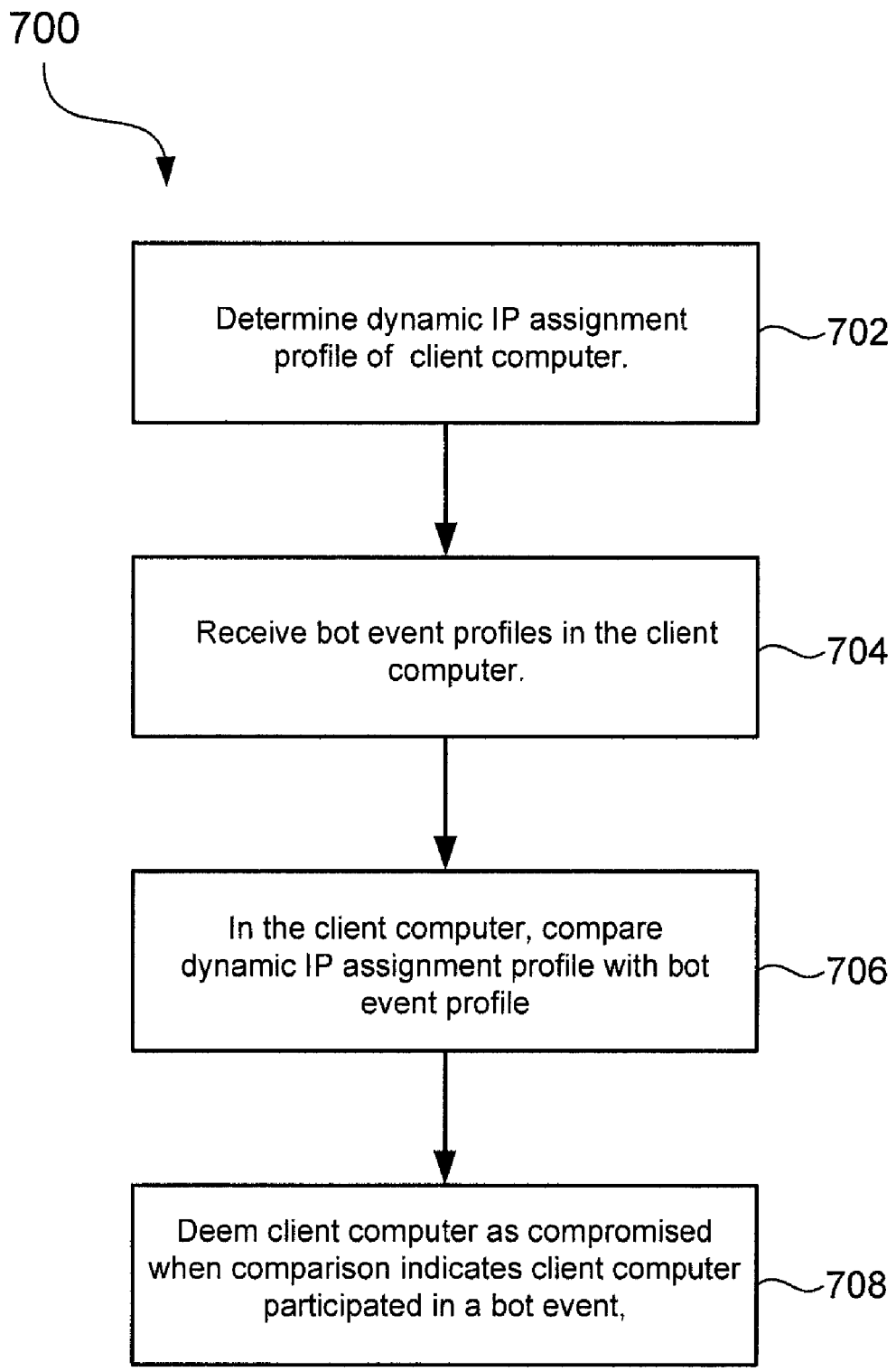
FIG. 7 shows a flow diagram of a method 700 of detecting the presence of software robots in client computers in accordance with an embodiment of the present invention.

FIG. 7 shows a flow diagram of a method 700 of detecting the presence of software robots in client computers in accordance with an embodiment of the present invention. The method 700 is explained using the components shown in FIG. 2 as an example.

The method 700 may be performed by the client-side bot detector 110 in the client computer 100. The client-side bot detector 110 may consult the dynamic IP assignment profile 112 to determine the dynamic IP addresses that have been assigned to the client computer 100 at particular time frames (step 702). Bot event profiles 221 may be received by the client computer 100 from the antivirus research server 220 over the Internet (step 704). The client-side bot detector 110 may compare the dynamic IP assignment profile 112 to the bot event profiles 221 to determine if any dynamic IP address that has been assigned to the client computer 100 is involved in a bot event during a time frame that dynamic IP address is assigned to the client computer 100 (step 706). The client-side bot detector of 110 deems the client computer 100 infected by a software robot when the result of the comparison indicates that the client computer 100 has been assigned a dynamic IP address involved in a bot event that occurred during the time the dynamic IP address is assigned to the client computer 100 (step 708).

Effective techniques for detecting software robots in client computers have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of detecting software robots in client computers, the method comprising:
   determining dynamic IP (internet protocol) addresses that have been dynamically assigned to a client computer to allow the client computer to communicate over a computer network, the client computer being a personal computer employed by a home user;
   receiving, at the client computer, from a server computer bot event profiles, which include web sites hosted by zombie computers infected by software robots and indicate IP addresses involved in malicious online activities perpetrated by software robots and time frames when the malicious online activities occurred;
   comparing the bot event profiles at the client computer with the dynamic IP addresses that have been assigned to the client computer to determine if any dynamic IP address, within said indicated time frames, that has been dynamically assigned to the client computer is involved in a malicious online activity indicated in the bot event profiles; and
   in response to said comparing, deeming the client computer as infected by a software robot when a result of the comparison indicates that a particular dynamic IP address has been dynamically assigned to the client computer during a time frame when a bot event indicated in the bot event profiles occurred.

2. The method of claim 1 wherein the malicious online activities indicated in the bot event profiles include spam e-mails sent by software robots from infected zombie computers.

3. The method of claim 1 wherein the malicious online activities indicated in the bot event profiles include botsites hosted by zombie computers infected by software robots.

4. The method of claim 3 wherein the botsites comprise web sites for perpetrating phishing.

5. The method of claim 1 wherein the dynamic IP addresses were assigned to the client computer by a DHCP (dynamic host control protocol) server computer.

6. The method of claim 1 wherein the client computer receives the bot event profiles from a server computer over the Internet.

7. The method of claim 6 wherein the server computer periodically provides updated bot event profiles to the client computer.

8. A system for detecting software robots in client computers, the system comprising:

a server computer configured to provide bot event profiles over a computer network to the client computers, the bot event profiles include web sites hosted by zombie computers infected by software robots and indicate indicating IP addresses involved in malicious online activities perpetrated by software robots and time frames when the malicious online activities occurred; and a client computer configured to receive the bot event profiles from the server computer over a computer network, the client computer being a personal computer employed by a home user, the client computer being configured to compare dynamic IP addresses, within said indicated time frames, that have been dynamically assigned to the client computer against IP addresses involved in the malicious online activities indicated in the bot event profiles to determine whether the client computer is infected by a software robot.

9. The system of claim 8 wherein the client computer is employed by a home user to navigate the Internet.

10. The system of claim 8 wherein the malicious online activities indicated in the bot event profiles include spam e-mails sent by software robots from infected zombie computers.

11. The system of claim 8 wherein the malicious online activities indicated in the bot event profiles include botsites hosted by zombie computers infected by software robots.

12. The system of claim 11 wherein the botsites comprise web sites for perpetrating phishing.

13. The system of claim 8 wherein the dynamic IP addresses were assigned to the client computer by a DHCP (dynamic host control protocol).

14. The system of claim 8 wherein the server computer periodically provides updated bot event profiles to the client computer.

15. A method of detecting software robots in client computers, the method comprising:

determining dynamic IP (Internet Protocol) addresses that have been dynamically assigned to a client computer at particular time frames, the client computer being a personal computer employed by a home user;

comparing the dynamic IP addresses at the client computer that have been assigned to the client computer within said particular time frames against IP addresses involved in malicious online activities perpetrated using software robots, wherein said involved IP addresses are identified in bot event profiles received from a server computer and the bot event profiles include web sites hosted by zombie computers infected by the software robots; and deeming the client computer as infected by a software robot when at least a particular dynamic IP address of the dynamic IP addresses that have been assigned to the client computer is involved at a particular malicious online activity perpetrated by a software robot during a time frame the particular dynamic IP address is assigned to the client computer.

16. The method of claim 15 wherein the particular malicious online activity comprises hosting a botsite.

17. The method of claim 16 wherein the botsite is for phishing.

18. The method of claim 15 wherein the particular malicious online activity comprises sending spam e-mail.

19. The method of claim 15 wherein the dynamic IP addresses that have been assigned to the client computer have been assigned by a DHCP (dynamic host configuration protocol) server.

20. The method of claim 15 wherein the client computer receives the IP addresses involved in the malicious online activities perpetrated using the software robots from a server over the Internet.

\* \* \* \* \*